United States Patent
Liao et al.

(10) Patent No.: US 11,238,624 B2
(45) Date of Patent: Feb. 1, 2022

(54) IMAGE TRANSFORM METHOD AND IMAGE TRANSFORM NETWORK

(71) Applicant: Industrial Technology Research Institute, Hsinchu (TW)

(72) Inventors: Duan-Li Liao, Taichung (TW); Chia-Chang Li, Pingtung County (TW); Wen-Hung Ting, Tainan (TW); Po-Lung Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 154 days.

(21) Appl. No.: 16/808,345

(22) Filed: Mar. 3, 2020

(65) Prior Publication Data
US 2021/0118195 A1 Apr. 22, 2021

(30) Foreign Application Priority Data
Oct. 22, 2019 (TW) ................. 108138116

(51) Int. Cl.
*G06T 11/00* (2006.01)
*G06T 11/60* (2006.01)

(52) U.S. Cl.
CPC ............ *G06T 11/001* (2013.01); *G06T 11/60* (2013.01)

(58) Field of Classification Search
CPC ..... G06T 11/001; G06T 11/60; G06N 3/0454; G06N 3/088
See application file for complete search history.

(56) References Cited

U.S. PATENT DOCUMENTS

| 8,810,634 B2 | 8/2014 | Li |
| 9,613,403 B2 | 4/2017 | Kim et al. |

(Continued)

FOREIGN PATENT DOCUMENTS

| CN | 107038724 | 8/2017 |
| CN | 109166087 | 1/2019 |
| TW | I555378 | 10/2016 |

OTHER PUBLICATIONS

Yaniv Taigman et al., "Unsupervised Cross-Domain Image Generation", Conference paper at ICLR 2017, Nov. 7, 2016, pp. 1-14.
(Continued)

*Primary Examiner* — Christopher Wait
(74) *Attorney, Agent, or Firm* — JCIPRNET

(57) ABSTRACT

Provided are an image transform method and an image transform network. The method is for the image transform network including an image generator, a transform discriminator and a focus discriminator, and includes: generating a transformed image according to an un-transformed image and focus information by the image generator; computing a transform discrimination value according to the transformed image by the transform discriminator; computing a value of a first generator loss function and updating the image generator by the image generator; generating a focus discrimination value according to the un-transformed image, the transformed image, and the focus information by the focus discriminator; and computing a value of a second generator loss function according to the focus discrimination value and updating the image generator according to the value of the second generator loss function by the image generator.

17 Claims, 7 Drawing Sheets

(56) References Cited

U.S. PATENT DOCUMENTS

| | | |
|---|---|---|
| 10,104,292 B2 | 10/2018 | Konttori et al. |
| 10,127,659 B2 | 11/2018 | Hsieh et al. |
| 2014/0267618 A1 | 9/2014 | Esteban et al. |
| 2017/0070720 A1 | 3/2017 | Bishop et al. |
| 2017/0201676 A1 | 7/2017 | Jeong et al. |
| 2017/0365038 A1 | 12/2017 | Denton et al. |
| 2018/0075581 A1 | 3/2018 | Shi et al. |
| 2018/0174052 A1 | 6/2018 | Rippel et al. |
| 2018/0190249 A1 | 7/2018 | Roblek et al. |
| 2018/0247183 A1 | 8/2018 | Kanebako |
| 2018/0247201 A1 | 8/2018 | Liu et al. |
| 2018/0268201 A1 | 9/2018 | Yu et al. |
| 2018/0286034 A1 | 10/2018 | Lim et al. |
| 2018/0286055 A1 | 10/2018 | Lim et al. |
| 2018/0293734 A1 | 10/2018 | Lim et al. |
| 2018/0307947 A1 | 10/2018 | Choi et al. |
| 2018/0314716 A1* | 11/2018 | Kim .................. G06T 1/0007 |
| 2019/0050987 A1 | 2/2019 | Hsieh et al. |

OTHER PUBLICATIONS

Parikshit Sakurikar et al., "RefocusGAN: Scene Refocusing using a Single Image", ECCV 2018, Sep. 8, 2018, pp. 1-16.
Sagie Benaim et al., "One-Sided Unsupervised Domain Mapping", 31st Conference on Neural Information Processing Systems, Dec. 4, 2017, pp. 1-11.

* cited by examiner

IMAGE TRANSFORM METHOD AND IMAGE TRANSFORM NETWORK

CROSS-REFERENCE TO RELATED APPLICATION

This application claims the priority benefit of Taiwan application serial no. 108138116, filed on Oct. 22, 2019. The entirety of the above-mentioned patent application is hereby incorporated by reference herein and made a part of this specification.

TECHNICAL FIELD

The disclosure relates to an image transform method and an image transform network.

BACKGROUND

Under the trend that mobile devices and social platforms are gaining popularity and developed prosperously, users now have diversified demands regarding photo shooting quality and image effects and hold stricter criteria on image quality. In order to meet the expectations of the market, the photo shooting function of mobile devices nowadays are developed in hope to live up to professional single lens cameras.

The designs for improving the photo shooting effect of mobile devices can be roughly categorized into hardware and software technical solutions. Hardware solutions include, for example, use of high-end light sensitive elements or multiple lenses, etc. However, adding a hardware component brings additional costs and is rather limited due to size consideration. As for software solutions, special image styles may be achieved through retouching with software image processing or learning algorithms. In the case of image transform technology for transforming a target object, among the conventional software solutions, there are still circumstances such as target region misjudgment, tone inconsistency before and after transformation, and color change of the target object. While the expected special effect can be achieved, color and tone distortions remain concerning.

SUMMARY

The disclosure provides an image transform method and an image transform network.

An exemplary embodiment of the disclosure provides an image transform method. The image transform method is for an image transform network connected with a first database and including an image generator, a transform discriminator, and a focus discriminator. The first database stores a plurality of untransformed images. The image transform method includes: computing by the image generator according to one of the untransformed images and at least one focus information of the one of the untransformed images to generate a transformed image; computing a transform discrimination value according to the transformed image by the transform discriminator; computing a value of a first generator loss function according to the transform discrimination value and updating parameters of the image generator according to the value of the first generator loss function by the image generator; computing by the focus discriminator according to the one of the untransformed images, the transformed image, and the focus information to generate at least one focus discrimination value; and computing a value of a second generator loss function according to the at least one focus discrimination value and updating the parameters of the image generator according to the value of the second generator loss function by the image generator.

An exemplary embodiment of the disclosure provides an image transform network. The image transform network is signal-connected with a first database storing a plurality of untransformed images and includes: an image generator, configured to perform computing and generate a transformed image according to one of the untransformed images and at least one focus information of the one of the untransformed images; a transform discriminator, signal-connected with the image generator, and configured to perform computing and generate a transform discrimination value according to the transformed image; and a focus discriminator, signal-connected with the image generator, and configured to perform computing according to the one of the untransformed images, the transformed image, and the at least one focus information to generate at least one focus discrimination value, wherein the image generator is further configured to perform: computing a value of a first generator loss function according to the transform discrimination value and updating parameters of the image generator according to the value of the first generator loss function; and computing a value of a second generator loss function according to the at least one focus discrimination value and updating the parameters of the image generator according to the value of the second generator loss function.

Based on the above, in the image transform method and the image transform network according to the embodiments of the disclosure, the image generator, the transform discriminator, and the focus discriminator perform machine learning together by using the untransformed image, the focus information, and the transformed image, so as to update the parameters of the image generator, thereby facilitating the image transform performance of the image generator.

Several exemplary embodiments accompanied with figures are described in detail below to further describe the disclosure in details.

DETAILED DESCRIPTION OF DISCLOSED EMBODIMENTS

Figure 1:
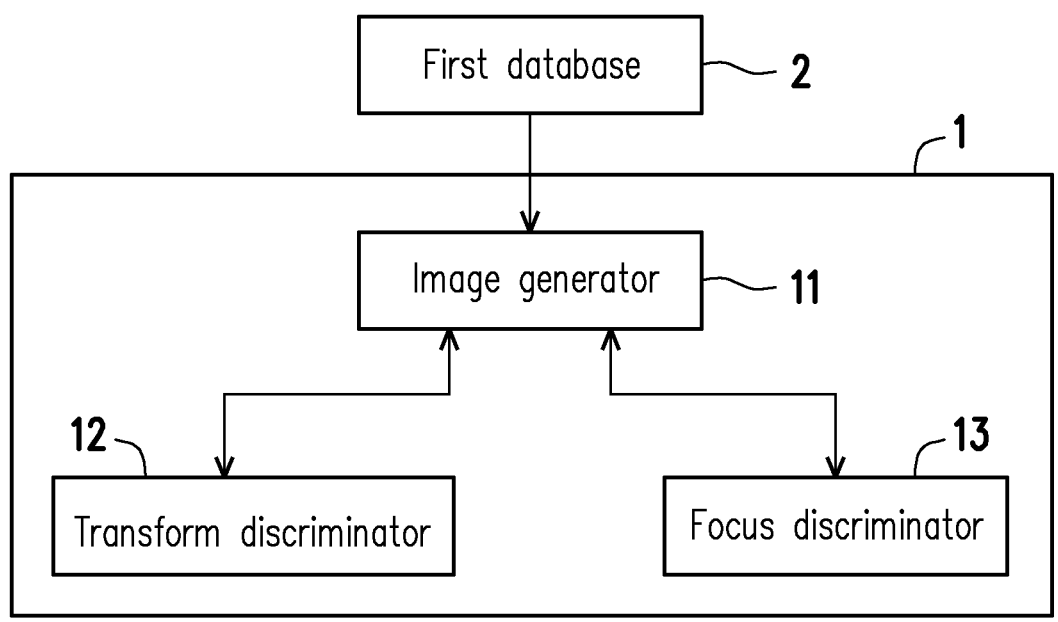
FIG. 1 is a block diagram illustrating an image transform network and a first database according to an embodiment of the disclosure.

In the specification of the disclosure, elements/components/steps labeled with same reference symbols represent same or similar parts in the drawings and embodiments. The descriptions of elements/components/steps labeled with the same reference symbols or defined with the same terms in different embodiments may serve as cross-reference to one another.

FIG. 1 is a block diagram illustrating an image transform network 1 and a first database 2 according to an embodiment of the disclosure. The first database 2 stores a plurality of untransformed images. Each of the untransformed images includes at least one focus information.

The image transform network 1 is connected with the first database 2 and may access the first database 2. The image transform network 1 may perform an image transform method and include an image generator 11, a transform discriminator 12 signal-connected with the image generator 11, and a focus discriminator 13 signal-connected with the image generator 11. The image generator 11 is capable of transforming an image, and is capable of performing, together with the transform discriminator 12 and the focus discriminator 13, generative adversarial network (GAN) learning to update the parameters.

Figure 2:
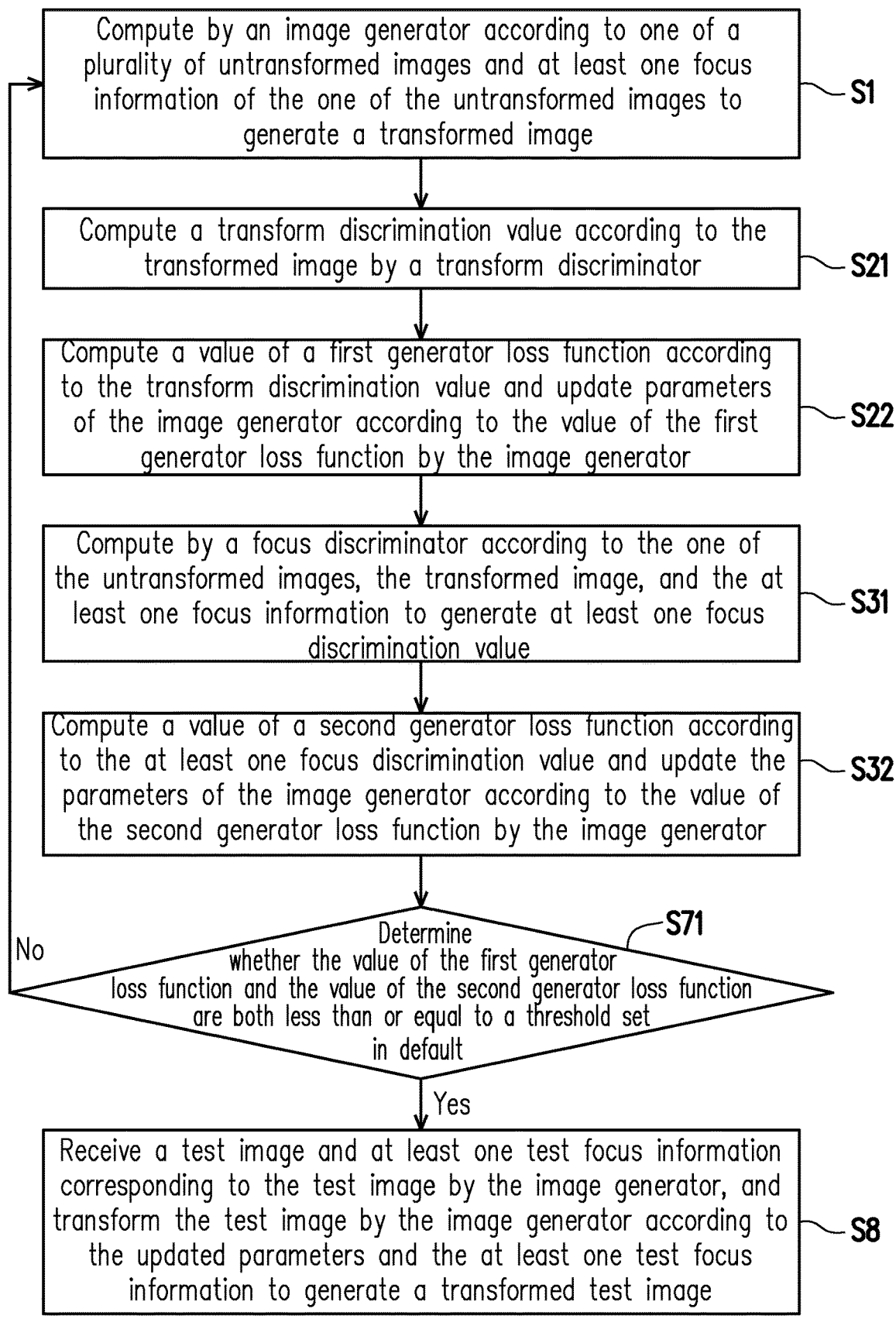
FIG. 2 is a flowchart illustrating an image transform method according to an embodiment of the disclosure.

Referring to FIG. 2, FIG. 2 is a flowchart illustrating an image transform method according to an embodiment of the disclosure. Before the image transform network 1 performs the image transform method, parameters are respectively set in default in the image generator 11, the transform discriminator 12, and the focus discriminator 13. In other words, initialization of parameter setting is firstly carried out, and the image transform method updates the parameters of the image generator 11, the transform discriminator 12, and the focus discriminator 13 by using learning computation, so as to optimize the transforming performance of the image transform network 1.

The steps of the image transform method of the embodiment are described in the following. Step S1 is performed, where the image generator 11 is configured to compute according to one of the untransformed images and at least one focus information of the one of the untransformed images to generate a transformed image. The one of the untransformed images is denoted by $I_A$, and the transformed image transformed from the untransformed image $I_A$ by the image generator 11 is denoted by $G(I_A)$. After choosing an untransformed image, i.e., the untransformed image $I_A$, from the first database 2, the image generator 11 of the embodiment then transforms the chosen untransformed image $I_A$ according to the chosen untransformed image $I_A$ and the focus information thereof to generate the transformed image $G(I_A)$. In the embodiment, the untransformed image $I_A$ has one focus information, but the untransformed image may also have multiple focus information and shall not be limited by the embodiment. It should also be noted that, while the image generator 11 of the embodiment performs shallow depth-of-field processing and transformation on the image, the disclosure is not limited thereto. For example, the image generator 11 may also perform transformations of other image effect, such as image brightness transformation, color optimization, etc.

After the transformed image $G(I_A)$ is obtained, Step S21 is performed, where the transform discriminator 12 computes a transform discrimination value according to the transformed image $G(I_A)$, and the transform discrimination value is denoted by $D(G(I_A))$. The transform discriminator 12 of the embodiment serves to discriminate the similarity or difference between input images, and the transform discrimination value is information representing a similarity level or a difference level between the images. Specifically, the transform discrimination value may be a value ranging from 0 to 1, and a greater value indicates a higher similarity level. However, the disclosure is not limited thereto, and the corresponding definition of the value may be adjusted based on the computational needs.

Then, Step S22 is performed, where the image generator 11 computes a value of a first generator loss function according to the transform discrimination value $D(G(I_A))$ and updates the parameters of the image generator 11 according to the value of the first generator loss function. The image generator 11 refers to the discrimination result of the transform discriminator 12, computes the value of the first generator loss function based on the first generator loss function, and further adjusts and updates the parameters based on the value of the first generator loss function. The first generator loss function is denoted as the equation:

$$L(G) = \mathbb{E}_{I_A \sim p_A}[\log(1 - D(G(I_A)))]$$

wherein $L(G)$ represents the first generator loss function, $\mathbb{E}$ represents an expected value, $I_A$ represents the untransformed image, $G(I_A)$ represents the transformed image, $p_A$ is the probability distribution of the first database 2, $I_A \sim p_A$ represents the untransformed image $I_A$ randomly chosen from the first database 2, and $D(G(I_A))$ represents the transform discrimination value. The value of the first generator loss function of the embodiment may be a value ranging from 0 and 1, and a lower value of the first generator loss function indicates that the image transform network 1 is closer to the ideal state. However, the disclosure is not limited thereto. The definition corresponding to the value may be adjusted based on computational needs.

Step S31 is performed, where the focus discriminator 13 computes according to the one of the untransformed images, the transformed image generated by the image generator 11, and the focus information to generate a focus discrimination value. The transformed image in Step S31 of the embodiment is generated by the image generator 11 by performing computation on the untransformed image $I_A$ chosen from the first database 2. In other words, the transformed image is generated by the image generator 11 with the updated parameters. The focus discriminator 13 of the embodiment serves to discriminate the similarity or difference between input images, and the focus discrimination value is information representing a similarity level or a difference level between the images. Specifically, the focus discrimination value may be a value ranging from 0 to 1, and a greater value indicates a higher similarity level. However, the disclosure is not limited thereto, and the corresponding definition of the value may be adjusted based on the computational needs.

Then, Step S32 is performed, where the image generator 11 computes a value of a second generator loss function according to the generated focus discrimination value and updates the parameters of the image generator 11 according to the value of the second generator loss function. The image generator 11 refers to the discrimination result of the focus discriminator 13, computes the value of the second generator loss function based on the second generator loss function, and further adjusts and updates the parameters of the image generator 11 based on the value of the second generator loss function. The value of the second generator loss function of the embodiment may be a value ranging from 0 and 1, and a lower value of the second generator loss function indicates that the image transform network 1 is closer to the ideal state. However, the disclosure is not limited thereto. The definition corresponding to the value may be adjusted based on computational needs.

In Steps S21 and S22 and Steps S31 and 32 of the embodiment, the image generators 11 updates the parameters according to different values of loss functions, and the order between Steps S21 and S22 and Steps S31 and S32 is interchangeable. In other words, Steps S31 and S32 may also be performed in sequence before Steps S21 and S22 are performed in sequence, and the order shall not be limited to the order described in the embodiment.

Step S71 is performed, where whether the value of the first generator loss function and the value of the second generator loss function are both less than or equal a threshold set in default is determined. In addition, in the case where any of the value of the first generator loss function and the value of the second generator loss function is greater than the threshold set in default, Steps S1, S21, S22, S31, S32, and S71 are repetitively carried out for learning and updating of the image generator 11.

In the case where the value of the first generator loss function and the value of the second generator loss function are both determined as less than or equal to the threshold set in default, the image generator 11 has completed learning. In addition, Step 8 is performed, where the image generator 11 receives a test image and at least one corresponding test focus information and transforms the test image according to the updated parameters and the at least one test focus information, so as to generate a transformed test image. It should be noted that, in Step S8 of the embodiment, the image generator 11 transforms the test image by using the parameters most recently updated by the image generator 11. In other words, the image transform method of the embodiment learns and optimizes the image transform network 1 through minimizing the values of the first and second loss generator functions. In the embodiment, each test image has one test focus information. However, the test image may have multiple test focus information, and shall not be limited by the embodiment.

In other embodiments, the criterion for determining whether the image generator 11 has completed learning and updating in Step S71 may also be whether the values of the first and second loss generator functions both converge. In other words, the image generator 11 may be determined as having completed learning in the case where the values of the first and second generator loss functions both converge, and the determination criterion of the disclosure shall not be limited to the threshold of the embodiment.

It should also be noted that the image generator 11 may be integrated in a mobile device (not shown), and the test image and the test focus information may be obtained from the mobile device and the lens (not shown) thereof. The test focus information of the test image may be determined by the user at the time of photo-shooting, such as the information at the time when the user touches the screen of the mobile device to focus when capturing an image. In the embodiment, the image generator 11 transforms the image obtained by the mobile device to generate the transformed test image exhibiting a shallow depth-of-field effect. However, the exhibited effect is not limited to the shallow depth-of-field effect, but may also be other image transform effects, such as image brightness transformation, color optimization, etc.

In the image transform method of the embodiment, the image generator 11 computes the value of the first generator loss function to update the parameters by using the transform discrimination value of the transform discriminator 12. Besides, the image generator 11 also computes the value of the second generator loss function to update the parameters by using the focus information and the focus discrimination value of the focus discriminator 13. In other words, the parameters of the image generator 11 of the embodiment is accomplished through at least two stages of learning computation.

Figure 3:
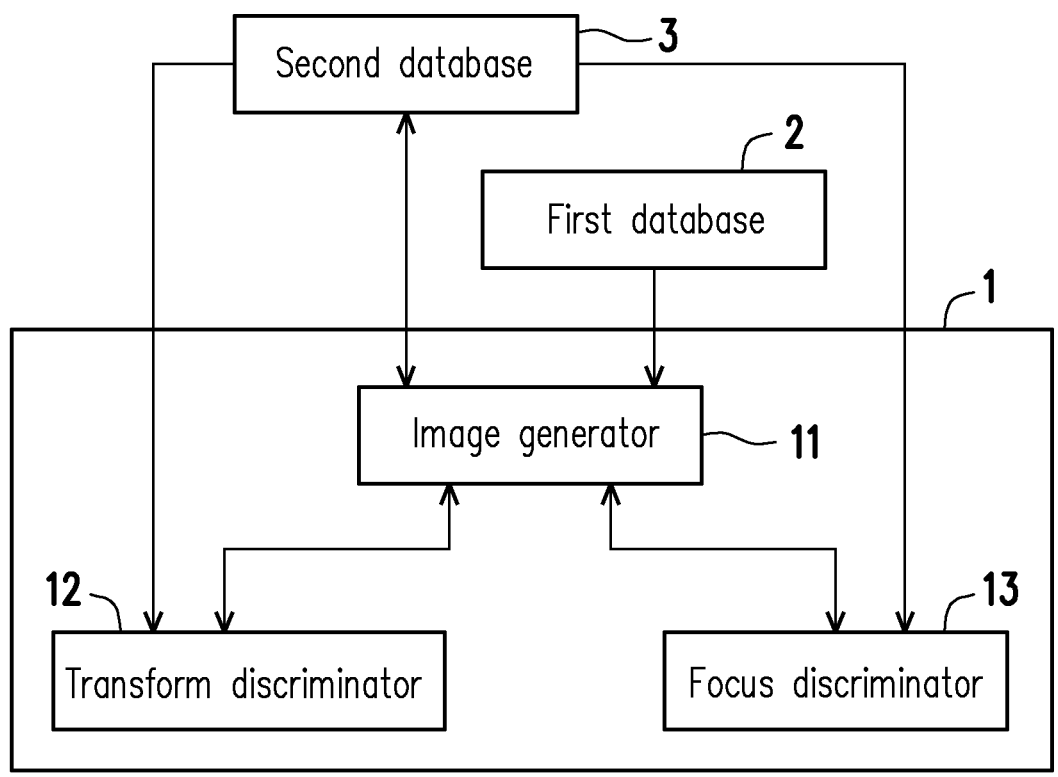
FIG. 3 is a block diagram illustrating an image transform network, a first database, and a second database according to an embodiment of the disclosure.

FIG. 3 is a block diagram illustrating the image transform network 1, the first database 2, and a second database 3 according to an embodiment of the disclosure. The first database 2 stores a plurality of untransformed images. Each of the untransformed images includes at least one focus information. The second database 3 stores a plurality of transform template images. In the embodiment, each untransformed image has one focus information. However, the untransformed image may also have multiple focus information and shall not be limited by the embodiment.

The first image transform network 1 is connected with the first database 2 and the second database 3, and may access the first database 2 and the second database 3. The image transform network 1 may perform an image transform method and include the image generator 11, the transform discriminator 12 signal-connected with the image generator 11, and the focus discriminator 13 signal-connected with the image generator 11. The image generator 11 is capable of transforming an image, and is capable of performing, together with the transform discriminator 12 and the focus discriminator 13, generative adversarial network (GAN) learning computation to update the parameters.

Figure 4:
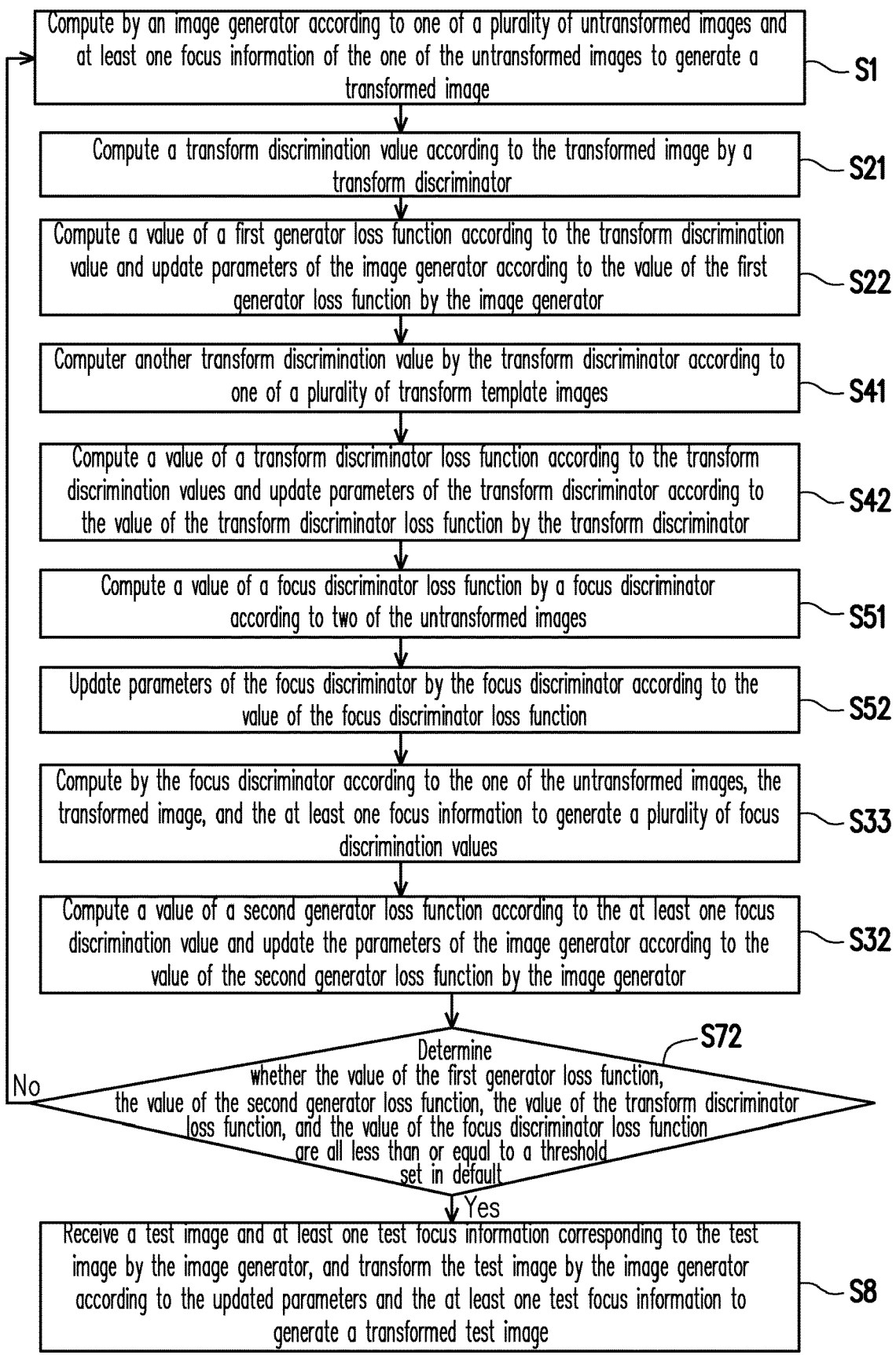
FIG. 4 is a flowchart illustrating an image transform method according to another embodiment of the disclosure.
Figure 5:
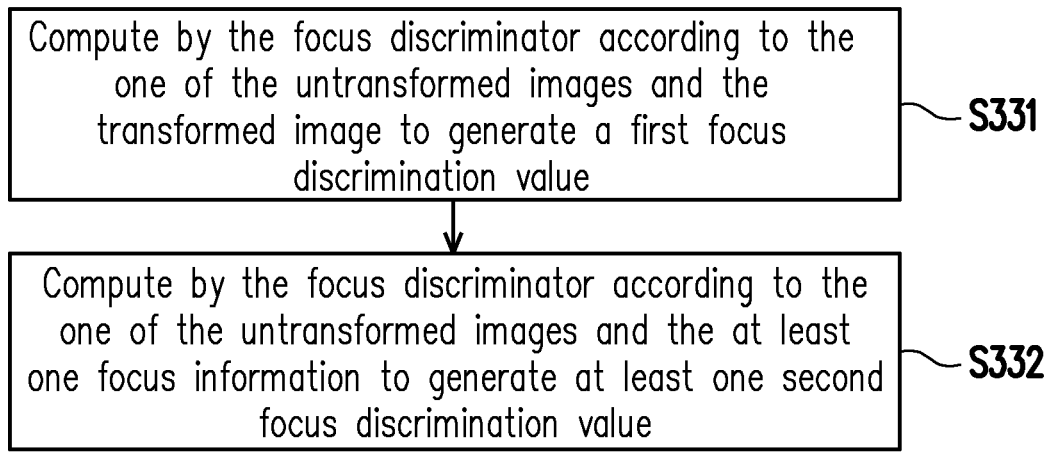
FIG. 5 is a flowchart illustrating some steps of an image transform method according to another embodiment of the disclosure.
Figure 6:
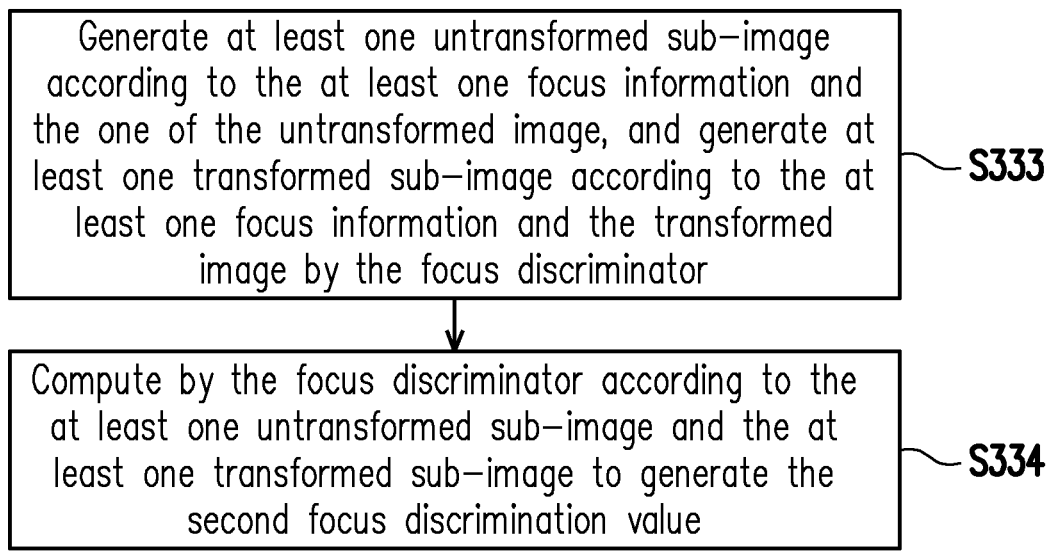
FIG. 6 is a flowchart illustrating some steps of an image transform method according to another embodiment of the disclosure.

FIGS. 4, 5, and 6 are flowcharts illustrating an image transform method according to another embodiment of the disclosure. The image transform method is for the image transform network 1, the first database 2, and the second database 3 shown in FIG. 3. Before the image transform network 1 performs the image transform method, parameters are respectively set in default in the image generator 11, the transform discriminator 12, and the focus discriminator 13. In other words, initialization of parameter setting is firstly carried out, and the image transform method updates the image generator 11, the transform discriminator 12, and the focus discriminator 13 by using learning computation, so as to optimize the transforming performance of the image transform network 1.

Referring to FIGS. 3 and 4, the steps of the image transform method of the embodiment are described in the following. Step S1 is performed, where the image generator 11 is configured to compute according to one of the untransformed images and at least one focus information of the one of the untransformed images to generate a transformed image. After choosing the untransformed image from the first database 2, the image generator 11 of the embodiment transforms the chosen untransformed image according to the untransformed image and the focus information thereof to generate the transformed image. In the embodiment, the untransformed image that is chosen has one focus information. However, the untransformed image that is chosen may also have multiple focus information. It should also be noted that, while the image generator 11 of the embodiment performs shallow depth-of-field processing and transformation on the image, the disclosure is not limited thereto. For example, the image generator 11 may also perform transformations of other image effect, such as image brightness transformation, color optimization, etc.

Step S21 is performed, where the transform discriminator 12 computes a transform discrimination value according to the transformed image. The transform discriminator 12 of the embodiment serves to discriminate the similarity or difference between input images, and the transform discrimination value is information representing a similarity level or a difference level between the images. Specifically, the transform discrimination value may be a value ranging from 0 to 1, and a greater value indicates a higher similarity level. However, the disclosure is not limited thereto, and the corresponding definition of the value may be adjusted based on the computational needs.

Then, Step S22 is performed, where the image generator 11 computes a value of a first generator loss function according to the transform discrimination value and updates the parameters of the image generator 11 according to the value of the first generator loss function. In other words, the image generator 11 refers to the discrimination result of the transform discriminator 12 and computes the value of the first generator loss function based on the first generator loss function, and then adjusts and updates the parameters based on the value of the first generator loss function. The first generator loss function is denoted as the equation:

$$L(G) = \mathbb{E}_{I_A \sim p_A}[\log(1 - D(G(I_A)))]$$

wherein $L(G)$ represents the first generator loss function, $\mathbb{E}$ represents an expected value, $I_A$ represents the untransformed image, $p_A$ represents the probability distribution of the first database 2, $I_A \sim p_A$ represents the untransformed image $I_A$ randomly chosen from the first database 2, $G(I_A)$ represents the transformed image, and $D(G(I_A))$ represents the transform discrimination value. The value of the first generator loss function of the embodiment may be a value ranging from 0 and 1, and a lower value of the first generator loss function indicates that the image transform network 1 is closer to the ideal state. However, the disclosure is not limited thereto. The definition corresponding to the value may be adjusted based on computational needs.

Step S41 is performed, where the transform discriminator 12 computes another transform discrimination value according to one of the transform template images. At Step S41, the transform discriminator 12 randomly chooses a transform template image denoted by $I_B$ from the second database 3, and performs computation on the transform template image $I_B$ that is chosen to obtain the another transform discrimination value denoted by $D(I_B)$. Besides, in the case where the parameters of the image generator 11 are updated in Step S22, Steps S1 and S21 are performed again. In other words, the transformed image $G(I_A)$ corresponding to the untransformed image $I_A$ is updated, and then Step S21 is performed again according to the updated transformed image $G(I_A)$ to update the transform discrimination value $D(G(I_A))$.

Then Step S42 is performed, where the transform discriminator 12 computes a value of a transform discriminator loss function according to the transform discrimination values $D(I_B)$ and $D(G(I_A))$, and updates the parameters of the transform discriminator 12 according to the value of the transform discriminator loss function. The value of the transform discriminator loss function is computed based on the transform discriminator loss function, and the transform discriminator loss function is denoted as the equation:

$$L(D) = \mathbb{E}_{I_A \sim p_A}[\log(D(G(I_A)))] \mathbb{E}_{I_B \sim p_B}[\log(1 - D(I_B))]$$

wherein $L(D)$ represents the transform discriminator loss function, $\mathbb{E}$ represents an expected value, $I_A$ represents the untransformed image, $p_A$ represents the probability distribution of the first database 2, $I_A \sim p_A$ is configured to represent the untransformed image $I_A$ randomly chosen from the first database 2, $G(I_A)$ represents the transformed image, $I_B$ represents the transform template image, $p_B$ represents the probability distribution of the second database 3, $I_B \sim p_B$ is configured to represent the transform template image $I_B$ randomly chosen from the second database 3, and $D(G(I_A))$ and $D(I_B)$ represent the transform discrimination values. In Step S42 of the embodiment, the transform discriminator 12 substitutes the transform discrimination values obtained by computing according to the transformed image and the transform template image into the transform discriminator loss function, i.e., the above equation, to compute the value of the transform discriminator loss function and update the parameters of the transform discriminator 12 accordingly. The value of the transform discriminator loss function of the embodiment may be a value ranging from 0 to 1, and a lower value of the transform discriminator loss function indicates that the image transform network 1 is closer to the ideal state. However, the disclosure is not limited thereto. The definition corresponding to the value may be adjusted based on computational needs.

Step S51 is performed, where the focus discriminator 13 computes a value of a focus discriminator loss function according to two of the untransformed images. At Step S51, the focus discriminator 13 randomly chooses two untransformed images from the first database 2, and performs computation on the untransformed images that are chosen. The focus discriminator 13 of the embodiment serves to discriminate the similarity or difference between input images, and the focus discrimination value is information representing a similarity level or a difference level between the images. Specifically, the focus discrimination value may be a value ranging from 0 to 1, and a greater focus discrimination value indicates a higher similarity level. However, the disclosure is not limited thereto, and the corresponding definition of the value may be adjusted based on computational needs.

For clearer description, the two untransformed images chosen at Step S51 are respectively denoted as an untransformed image $I_A$ and an untransformed image $I_{A'}$. At Step S51 of the embodiment, the focus discriminator 13 computes a focus discrimination value denoted by $D_S(I_A, I_{A'})$ according to the untransformed image $I_A$ and the untransformed image $I_{A'}$, computes another focus discrimination value denoted by $D_S(I_A, I_A)$ according to the untransformed image $I_A$, and computes yet another focus discrimination value denoted by $D_S(I_{A'}, I_{A'})$ according to the untransformed image $I_{A'}$.

After the focus discrimination values $D_S(I_A, I_{A'})$, $D_S(I_A, I_A)$, and $D_S(I_{A'}, I_{A'})$ are obtained, the focus discriminator 13 refers to a focus discriminator loss function and computes a value of the focus discriminator loss function according to the focus discrimination values $D_S(I_A, I_{A'})$, $D_S(I_A, I_A)$, and $D_S(I_{A'}, I_{A'})$, and the focus discriminator loss function is denoted as the equation:

$$L(D_S) = \mathbb{E}_{I_A, I_{A'} \sim p_A}[\log(D_S(I_A, I_{A'}))] \mathbb{E}_{I_A, I_{A'} \sim p_A}[\log(1 - D_S(I_A, I_A))] + \mathbb{E}_{I_A, I_{A'} \sim p_A}[\log(1 - D_S(I_{A'}, I_{A'}))]$$

wherein $L(D_S)$ represents the focus discriminator loss function, $\mathbb{E}$ represents an expected value, $I_{A'}, I_A$, represents the untransformed image, $p_A$ represents the probability distribution of the first database 2, $I_A, I_{A'} \sim p_A$ represents the untransformed images $I_A$ and $I_{A'}$ randomly chosen from the first database 2, and $D_S(I_A, I_{A'}) \sim D_S(I_A, I_A)$ and $D_S(I_{A'}, I_{A'})$ represent the focus discrimination values.

Step S52 is then performed, where the focus discriminator 13 updates the parameters of the focus discriminator 13 according to the value of the focus discriminator loss function. The value of the focus discriminator loss function of the embodiment may be a value ranging from 0 to 1, and a lower value of the focus discriminator loss function indicates that the image transform network 1 is closer to the ideal state. However, the disclosure is not limited thereto. The definition corresponding to the value may be adjusted based on computational needs.

Then, Step S33 is performed, where the focus discriminator 13 computes according to the transformed image, the one of the untransformed images, and the at least one focus information, so as to generate a plurality of focus discrimination values. Each untransformed image may have one or more focus information, and, as an example, the embodiment is described as having one focus information. The one of the untransformed images may be the untransformed image $I_A$ chosen at Step S1, and the focus discrimination values may include a first focus discrimination value and at least one second focus discrimination value. FIGS. 5 and 6 are flowcharts illustrating Step S33 according to the image transform method of the disclosure.

Referring to FIG. 5, details of Step S33 of the embodiment are described in the following. Step S331 is performed, where the focus discriminator 13 computes according to the one of the untransformed images, i.e., the chosen untransformed image $I_A$, and the transformed image $G(I_A)$ transformed by the image generator 11 to generate the first focus discrimination value. The first focus discrimination value is denoted by $D_S(I_A, G(I_A))$. Step S332 is performed, where the focus discriminator 13 computes according to the one of the untransformed images, i.e., the chosen untransformed image $I_A$, and the at least one focus information to generate the at least one second focus discrimination value. In the embodiment, the number of the focus information is one, and the number of the second discrimination value is also one. However, the disclosure is not limited thereto. The details of Step S332 are shown in FIG. 6 and will be described in subsequent paragraphs.

Referring to FIG. 6, for clearer description, the focus information corresponding to the untransformed image $I_A$ is denoted by (x, y), and the details of Step S332 of the embodiment are described in the following. Step S333 is performed, where the focus discriminator 13 generates an untransformed sub-image according to the at least one focus information, i.e., the focus information (x, y), and the one of the untransformed images (i.e., the untransformed image $I_A$), and generates at least one transformed sub-image according to the at least one focus information, i.e., the focus information (x, y), and the transformed image $G(I_A)$. In the embodiment, the number of the focus information is one, so the number of the transformed sub-image is also one. However, the numbers thereof are not limited to those described in the embodiment and may be more than one. Besides, in the embodiment, the focus discriminator 13 obtains a block corresponding to the focus information (x, y) in the untransformed image $I_A$ to serve as the untransformed sub-image denoted by $S(I_A, x, y)$, and obtains a block corresponding to the focus information (x, y) in the transformed image $G(I_A)$ to serve as the transformed sub-image denoted by $S(G(I_A), x, y)$.

Then, Step S334 is performed, where the focus discriminator 13 computes according to the untransformed sub-image $S(I_A, x, y)$ and the at least one transformed sub-image, i.e., the transformed sub-image $S(G(I_A), x, y)$, to generate the at least one second focus discrimination value. In the embodiment, the number of the second focus discrimination value is one, and is denoted by $D_S(S(I_A, x, y), S(G(I_A), x, y))$.

After the first and second focus discrimination values are obtained, Step S32 is performed, where the image generator 11 computes a value of a second generator loss function according to the focus discrimination values and updates the parameters of the image generator 11 according to the value of the second generator loss function. That is, the image generator 11 refers to the discrimination result of the focus discriminator 13, i.e., the first focus discrimination value $D_S(I_A, G(I_A))$ and the second focus discrimination value $D_S(S(I_A, x, y), S(G(I_A), x, y))$, computes the value of the second generator loss function based on the second generator loss function, and adjusts and updates the parameters according to the value of the second generator loss function. The second generator loss function is denoted as the equation:

$$L(G_S) = \mathbb{E}_{I_A \sim p_A}[\log(1 - D_S(I_A, G(I_A)))] + \mathbb{E}_{I_A \sim p_A}[\log(1 - D_S(S(I_A,x,y), S(G(I_A),x,y)))]$$

wherein $L(G_S)$ represents the second generator loss function, $\mathbb{E}$ represents an expected value, $I_A$ represents the untransformed image, $G(I_A)$ represents the transformed image, $p_A$ represents the probability distribution of the first database 2, $I_A \sim p_A$ serves to represent the untransformed image $I_A$ randomly chosen from the first database 2, (x, y) represents the focus information, $S(I_A, x, y)$ represents the untransformed sub-image, $S(G(I_A), x, y)$ represents the transformed sub-image, $D_S(I_A, G(I_A))$ represents the first focus discrimination value, and $D_S(S(I_A, x, y), S(G(I_A), x, y))$ represents the second focus discrimination value. The value of the second generator loss function of the embodiment may be a value ranging from 0 and 1, and a lower value of the second generator loss function indicates that the image transform network 1 is closer to the ideal state. However, the disclosure is not limited thereto. The definition corresponding to the value may be adjusted based on computational needs.

Step S72 is performed to determine whether the value of the first generator loss function, the value of the second generator loss function, the value of the transform discriminator loss function, and the value of the focus discriminator loss function are all less than or equal to a threshold set in default. In addition, in the case where any of the value of the first generator loss function, the value of the second generator loss function, the value of the transform discriminator loss function, and the value of the focus discriminator loss function is greater than the threshold set in default, Steps S1, S21, S22, S41, S42, S51, S52, S33, S32, and S72 are repetitively carried out for learning and updating of the image generator 11, the transform discriminator 12, and the focus discriminator 13.

In the case where the value of the first generator loss function, the value of the second generator loss function, the value of the transform discriminator loss function and the value of the focus discriminator loss function are all less than or equal to the threshold set in default, the image generator 11 is determined as having completed learning. In addition, Step 8 is performed, where the image generator 11 receives a test image and at least one corresponding focus information and transforms the test image according to the updated parameters and the at least one test focus information, so as to generate a transformed test image. It should be noted that, in Step S8 of the embodiment, the image generator 11 transforms the test image by using the parameters most recently updated the image generator 11. In other words, the image transform method of the embodiment learns and optimizes the image transform network 1 through minimizing the values of the first and second loss generator functions, the value of the transform discriminator loss function, and the value of the focus discriminator loss function. In the embodiment, each test image has one test focus information. However, the test image may have multiple test focus information, and shall not be limited by the embodiment.

In other embodiments, in Step S72, the criterion for determining whether the image generator 11, the transform discriminator 12, and the focus discriminator 13 have completed learning and updating may also be whether the value of the first generator loss function, the value of the second generator loss function, the value of the transform loss function, and the value of the focus discriminator loss function respectively converge. In other words, the image generator 11 may be determined as having completed learning in the case where the values of the first and second generator loss functions, the value of the transform discriminator loss function, and the value of the focus discriminator loss function all converge. Therefore, the determination criterion of the disclosure shall not be limited to the threshold of the embodiment.

It should be noted that the order between Steps S21 and S22 and Steps S41 and S42 is interchangeable. In other words, in other embodiments, Steps S41 and S42 may also be performed in sequence after Step S1 is performed. Then, after Step 42 is performed, Steps S21 and S22 are performed in sequence. Therefore, the order for performing the steps is not limited to the order described in the embodiment.

It should also be noted that the image generator 11 may be integrated in a mobile device, and the test image and the corresponding test focus information may be obtained from the lens of the mobile device. The test focus information of the test image may be determined when the user captures an image, such as the information at the time when the user touches the screen of the mobile device to focus when capturing the image. In the embodiment, the image generator 11 transforms the image obtained by the mobile device to generate the transformed test image exhibiting a shallow depth-of-field effect. However, the exhibited effect is not limited to the shallow depth-of-field effect, but may also be other image transform effects, such as image brightness transformation, color optimization, etc.

In the image transform method of the embodiment, the image generator 11 computes the value of the first generator loss function to update the parameters by using the transform discrimination value of the transform discriminator 12, and computes the value of the transform loss function to update the transform discriminator 12. Besides, the focus discriminator 13 is updated according to the value of the focus loss function. In addition, the focus discriminator 13 computes the focus discrimination value by using the focus information, and computes the value of the second generator loss function to update the parameters of the image generator 11. In other words, the image generator 11 of the embodiment is engaged in adversarial learning with the transform discriminator 12 and the focus discriminator 13, and the parameters of the image generator 11 is accomplished through at least two stages of learning computation.

Figure 7:
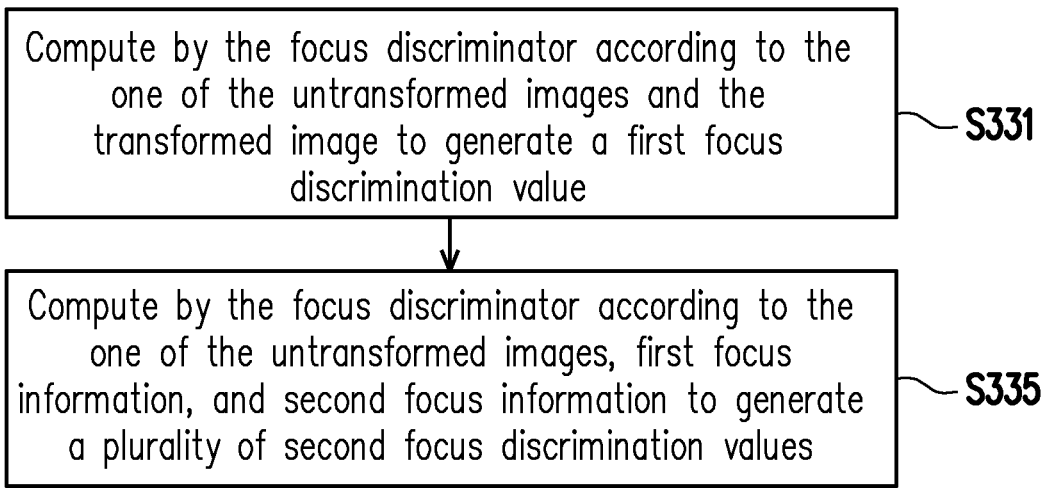
FIG. 7 is a flowchart illustrating some steps of an image transform method according to another embodiment of the disclosure.
Figure 8:
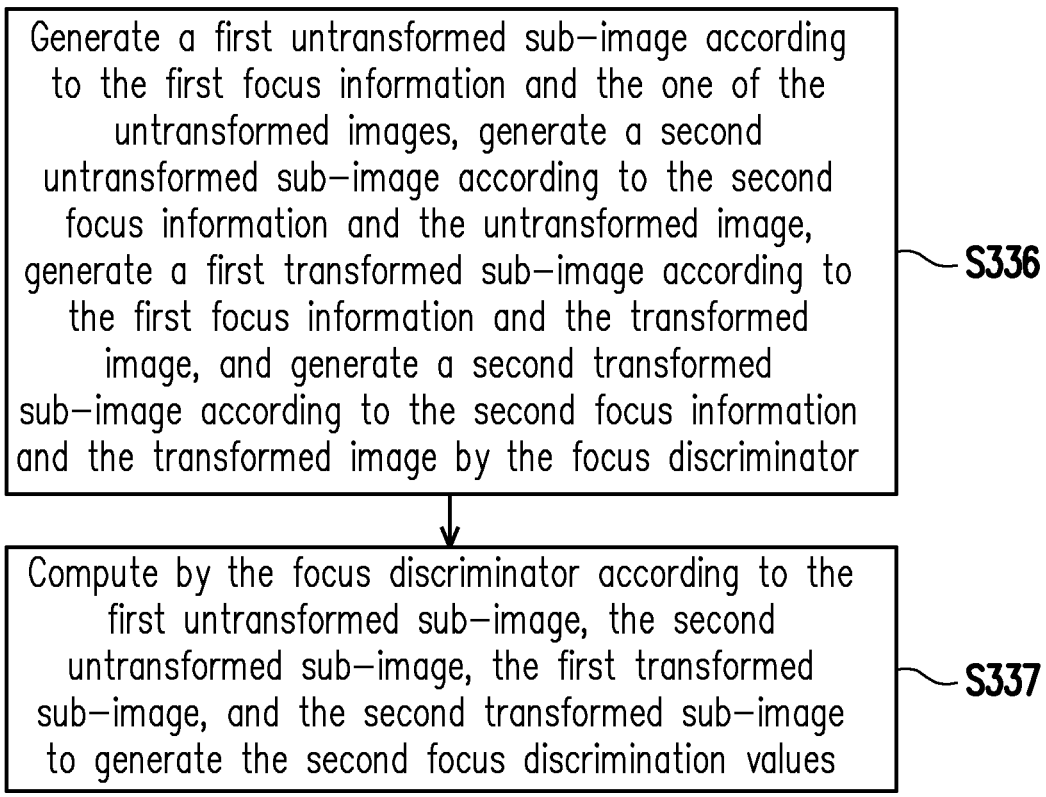
FIG. 8 is a flowchart illustrating some steps of an image transform method according to another embodiment of the disclosure.

Referring to FIGS. 4, 7, and 8, FIGS. 4, 7, and 8 are flowcharts illustrating an image transform method according to another embodiment of the disclosure. Similar to the embodiment shown in FIGS. 4, 5, and 6, the image transform method of the embodiment is for the image transform network 1 connected with the first database 2 and the second database 3 shown in FIG. 3. The image transform method of the embodiment differs from the embodiment of FIGS. 4, 5, and 6 in that the untransformed image of the embodiment has a plurality of focus information. Here, an embodiment with two focus information is described as an example. In the embodiment, the focus information of the untransformed image includes a first focus information $(x_1, y_1)$ and a second focus information $(x_2, y_2)$.

The difference in steps performed between the embodiment and the embodiment shown in FIGS. 4, 5, and 6 is described in the following. FIG. 7 is a flowchart illustrating details of Step 33 of the embodiment. Referring to FIG. 7, Step S33 of the embodiment includes the following. Step S331 is performed, where the focus discriminator 13 computes according to the one of the untransformed images (i.e., the untransformed image $I_A$) and the transformed image $G(I_A)$ to generate the first focus discrimination value. Step S335 is performed, where the focus discriminator 13 computes according to the one of the untransformed images (i.e., the untransformed image $I_A$), the first focus information, and the second focus information to generate a plurality of second focus discrimination values.

FIG. 8 is a flowchart illustrating details of Step 335 of the embodiment. Referring to FIG. 8, Step S335 of the embodiment includes the following. Step S336 is performed, where the focus discriminator 13 generates a first untransformed sub-image according to the first focus information $(x_1, y_1)$ and the one of the untransformed images, i.e., the untransformed image $I_A$, generates a second untransformed sub-image according to the second focus information $(x_2, y_2)$ and the untransformed image $I_A$, generates a first transformed sub-image according to the first focus information $(x_1, y_1)$ and the transformed image $G(I_A)$, and generates a second transformed sub-image according to the second focus information $(x_2, y_2)$ and the transformed image $G(I_A)$. In the embodiment, the focus discriminator 13 obtains blocks respectively corresponding to the first focus information $(x_1, y_1)$ and the second focus information $(x_2, y_2)$ in the untransformed image $I_A$ to serve as the first untransformed sub-image and the second untransformed sub-image respectively denoted by $S(I_A, x_1, y_1)$ and $S(I_A, x_2, y_2)$, and obtains blocks respectively corresponding to the first focus information $(x_1, y_1)$ and the second focus information $(x_2, y_2)$ in the transformed image $G(I_A)$ to serve as the first transformed sub-image and the second transformed sub-image respectively denoted by $S(G(I_A), x_1, y_1)$ and $S(G(I_A), x_2, y_2)$.

Then, Step S337 is performed, where the focus discriminator 13 computes according to the first untransformed sub-image $S(I_A, x_1, y_1)$, the second untransformed sub-image $S(I_A, x_2, y_2)$, the first transformed sub-image $S(G(I_A), x_1, y_1)$, and the second transformed sub-image $S(G(I_A), x_2, y_2)$ to generate two second focus discrimination values respectively denoted by $D_S(S(I_A, x_1, y_1), S(G(I_A), x_1, y_1))$ and $D_S(S(I_A, x_2, y_2), S(G(I_A), x_2, y_2))$.

After the first and second focus discrimination values are obtained, Step S32 is performed, where the image generator 11 computes the value of the second generator loss function according to the first and second focus discrimination values and updates the parameters of the image generator 11 according to the value of the second generator loss function. In the embodiment, the second generator loss function is denoted as the equation:

$$L(G_S) = \mathbb{E}_{I_A \sim P_A}[\log(1 - D_S(I_A, G(I_A)))] + \mathbb{E}_{I_A \sim P_A}[\log(1 - D_S(S(I_A, x_1, y_1), S(G(I_A), x_1, y_1)))] + \mathbb{E}_{I_A \sim P_A}[\log(1 - D_S(S(I_A, x_2, y_2), S(G(I_A), x_2, y_2)))]$$

wherein $L(G_S)$ represents the second generator loss function, $\mathbb{E}$ represents an expected value, $I_A$ represents the untransformed image, $G(I_A)$ represents the transformed image, $p_A$ represents the probability distribution of the first database 2, $I_A \sim p_A$ represents that the untransformed image $I_A$ is randomly chosen from the first database 2, $(x_1, y_1)$ and $(x_2, y_2)$ represent the focus information, $S(I_A, x_1, y_1)$ and $S(I_A, x_2, y_2)$ represent the untransformed sub-images, $S(G(I_A), x_1, y_1)$ and $S(G(I_A), x_2, y_2)$ represent the transformed sub-images, $D_S(I_A, G(I_A))$ represents the first focus discrimination value, and $D_S(S(I_A, x_1, y_1), S(G(I_A), x_1, y_1))$ and $D_S(S(I_A, x_2, y_2), S(G(I_A), x_2, y_2))$ represent the second focus discrimination values.

The value of the second generator loss function of the embodiment may be a value ranging from 0 and 1, and a lower value of the second generator loss function indicates that the image transform network 1 is closer to the ideal state. However, the disclosure is not limited thereto. The definition corresponding to the value may be adjusted based on computational needs.

After Step S337 is performed, like the previous embodiment, Step S32 is performed to update the parameters of the image generator 11, and after learning is determined as having completed in Step S72, Step S8 is performed, where the image generator 11 receives a test image and at least one test focus information corresponding to the test image, and the image generator 11 transforms the test image according to the updated parameters and the at least one test focus information, so as to generate a transformed test image. It should be noted that, in Step S8 of the embodiment, the image generator 11 transforms the test image by using the parameters most recently updated the image generator 11. It should also be noted that, in the embodiment, each test image has two test focus information. However, the disclosure is not limited thereto. The number of the test focus information may also be greater than 2.

Figure 9:
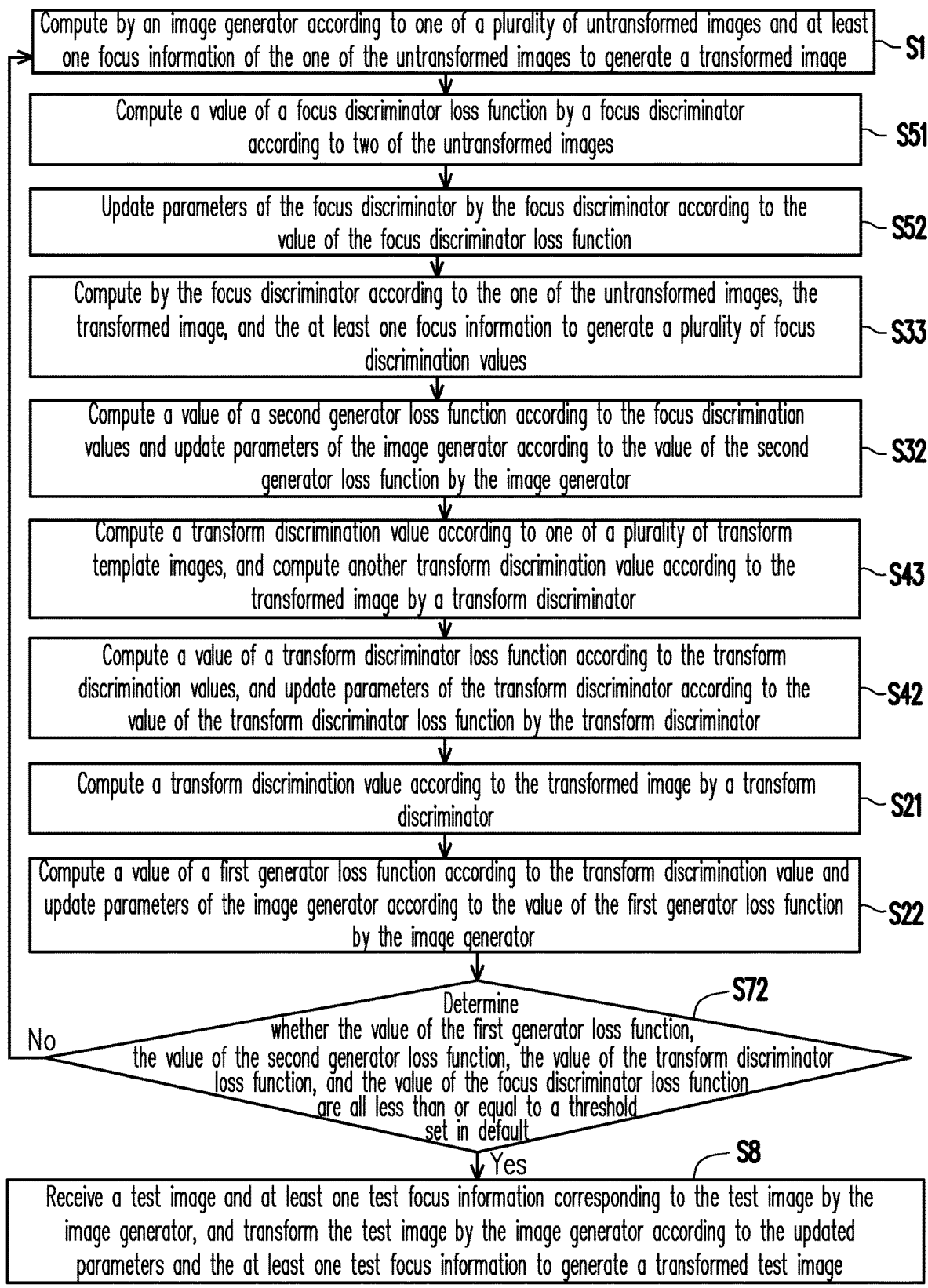
FIG. 9 is a flowchart illustrating an image transform method according to another embodiment of the disclosure.

Referring to FIGS. 5, 6, 9, FIGS. 5, 6, and 9 are flowcharts illustrating an image transform method according to another embodiment of the disclosure. The image transform method of the embodiment is for the image transform network 1, the first database 2, and the second database 3. The first database 2 stores a plurality of untransformed images. Each of the untransformed images includes at least one focus information. The second database 3 stores a plurality of transform template images. In the embodiment, each untransformed image has one focus information. However, each untransformed image may also have multiple focus information and shall not be limited by the embodiment.

Referring to FIG. 3, before the image transform network 1 performs the image transform method, parameters are respectively set in default in the image generator 11, the transform discriminator 12, and the focus discriminator 13. In other words, initialization of parameter setting is firstly carried out, and the image transform method updates the image generator 11, the transform discriminator 12, and the focus discriminator 13 by using learning computation, so as to optimize the transforming performance of the image transform network 1.

The steps of the image transform method of the embodiment are described in the following. Step S1 is performed, where the image generator 11 is configured to compute according to one of the untransformed images and the at least one focus information of the one of the untransformed images to generate a transformed image. After choosing the untransformed image from the first database 2, the image generator 11 transforms the chosen untransformed image according to the untransformed image and the focus information thereof to generate the transformed image. In the embodiment, the image generator 11 may perform a shallow depth-of-field processing and transformation on the image. However, the disclosure is not limited thereto. For example, the image generator 11 may also perform other image effect transformations, such as image brightness transformation, color optimization, etc.

After the transformed image is obtained, Step S51 is performed, where the focus discriminator 13 computes a value of a focus discriminator loss function according to two of the untransformed images. At Step S51, the focus discriminator 13 randomly chooses two untransformed images from the first database 2, and performs computation on the chosen images. The focus discriminator 13 of the embodiment serves to discriminate the similarity or difference between input images, and the focus discrimination value is information representing a similarity level or a difference level between the images. Specifically, the focus discrimination value may be a value ranging from 0 to 1, and a greater focus discrimination value indicates a higher similarity level. However, the disclosure is not limited thereto, and the corresponding definition of the value may be adjusted based on computational needs.

For clearer description, the two untransformed images chosen at Step S51 are respectively denoted as an untransformed image $I_A$ and an untransformed image $I_{A'}$. At Step S51 of the embodiment, the focus discriminator 13 computes a focus discrimination value denoted by $D_S(I_A, I_{A'})$ according to the untransformed image $I_A$ and the untransformed image $I_{A'}$, computes another focus discrimination value denoted by $D_S(I_A, I_A)$ according to the untransformed image $I_A$, and computes yet another focus discrimination value denoted by $D_S(I_{A'}, I_{A'})$ according to the untransformed image $I_{A'}$.

After the focus discrimination values $D_S(I_A, I_{A'})$, $D_S(I_A, I_A)$, and $D_S(I_{A'}, I_{A'})$ are obtained, the focus discriminator 13 refers to a focus discriminator loss function and computes a value of the focus discriminator loss function according to the focus discrimination values $D_S(I_A, I_{A'})$, $D_S(I_A, I_A)$, and $D_S(I_{A'}, I_{A'})$, and the focus discriminator loss function is denoted as the equation:

$$L(D_S) = \mathbb{E}_{I_A, I_{A'} \sim P_A}[\log(D_S(I_A, I_{A'}))] + \mathbb{E}_{I_A, I_{A'} \sim P_A}[\log(1 - D_S(I_A, I_A))] + \mathbb{E}_{I_A, I_{A'} \sim P_A}[\log(1 - D_S(I_{A'}, I_{A'}))]$$

wherein $L(D_S)$ represents the focus discriminator loss function, $\mathbb{E}$ represents an expected value, $I_A \sim I_{A'}$ represents the untransformed image, $p_A$ represents the probability distribution of the first database 2, $I_A, I_{A'} \sim P_A$ represents the untransformed images $I_A$ and $I_{A'}$ randomly chosen from the first database 2, and $D_S(I_A, I_{A'}) \sim D_S(I_A, I_A)$ and $D_S(I_{A'}, I_{A'})$ represent the focus discrimination values. Step S52 is then performed, where the focus discriminator 13 updates the parameters of the focus discriminator 13 according to the value of the focus discriminator loss function. The value of the focus discriminator loss function of the embodiment may be a value ranging from 0 to 1, and a lower value of the focus discriminator loss function indicates that the image transform network 1 is closer to the ideal state. However, the disclosure is not limited thereto. The definition corresponding to the value may be adjusted based on computational needs.

Then, Step S33 is performed, where the focus discriminator 13 computes according to the transformed image, the one of the untransformed images, and the at least one focus information, so as to generate a plurality of focus discrimination values. The one of the untransformed images may be the untransformed image $I_A$ chosen at Step S1, and the focus discrimination values may include a first focus discrimination value and at least one second focus discrimination value. FIGS. 5 and 6 are flowcharts illustrating Step S33 according to the image transform method of the disclosure.

Referring to FIG. 5, details of Step S33 of the embodiment are described in the following. Step S331 is performed, where the focus discriminator 13 computes according to the one of the untransformed images, i.e., the untransformed image $I_A$, and the transformed image $G(I_A)$ transformed by the image generator 11 to generate the first focus discrimination value. The first focus discrimination value is denoted by $D_S(I_A, G(I_A))$. Step S332 is performed, where the focus discriminator 13 computes according to the one of the untransformed images, i.e., the untransformed image $I_A$, and the at least one focus information to generate the at least one second focus discrimination value. In the embodiment, the number of the focus information is one. However, the disclosure is not limited thereto. The details of Step S332 are shown in FIG. 6 and will be described in subsequent paragraphs.

Referring to FIG. 6, for clearer description, the focus information corresponding to the untransformed image $I_A$ is denoted by (x, y), and the details of Step S332 of the embodiment are described in the following. Step S333 is performed, where the focus discriminator 13 generates at least one untransformed sub-image according to the at least one focus information, i.e., the focus information (x, y), and the one of the untransformed images (i.e., the untransformed image $I_A$), and generates at least one transformed sub-image according to the at least one focus information, i.e., the focus information (x, y), and the transformed image $G(I_A)$. In the embodiment, the number of the focus information is one, so the numbers of the transformed sub-image and the untransformed sub-image are respectively one, too. However, the numbers are not limited to those described in the embodiment and may be more than one. Moreover, in the embodiment, the focus discriminator 13 obtains a block corresponding to the focus information (x, y) in the untransformed image to serve as the untransformed sub-image denoted by $S(I_A, x, y)$, and obtains a block corresponding to the focus information (x, y) in the transformed image to serve as the transformed sub-image denoted by $S(G(I_A), x, y)$. Then, Step S334 is performed, where the focus discriminator 13 computes according to $(I_A, x, y)$ and the at least one transformed sub-image $S(G(I_A), x, y)$ to generate the at least one second focus discrimination value. In the embodiment, the number of the second focus discrimination value is one, and is denoted by the expression $D_S(S(I_A, x, y), S(G(I_A), x, y))$.

After the first and second focus discrimination values are obtained, Step S32 is performed, where the image generator 11 computes the value of the second generator loss function according to the focus discrimination values and updates the parameters of the image generator 11 according to the value of the second generator loss function. That is, the image generator 11 refers to the discrimination result of the focus discriminator 13, i.e., the first focus discrimination value $D_S(I_A, G(I_A))$ and the second focus discrimination value $D_S(S(I_A, x, y), S(G(I_A), x, y))$, computes the value of the second generator loss function based on the second generator loss function, and adjusts and updates the parameters according to the value of the second generator loss function. The second generator loss function is denoted as the equation:

$$L(G_S) = \mathbb{E}_{I_A \sim P_A}[\log(1 - D_S(I_A, G(I_A)))] + \mathbb{E}_{I_A \sim P_A}[\log(1 - D_S(S(I_A, x, y), S(G(I_A), x, y)))]$$

wherein $L(G_S)$ represents the second generator loss function, $\mathbb{E}$ represents an expected value, $I_A$ represents the untransformed image, $G(I_A)$ represents the transformed image, $p_A$ represents the probability distribution of the first database 2, $I_A \sim P_A$ serves to represent the untransformed image $I_A$ randomly chosen from the first database 2, (x, y) represents the focus information, $S(I_A, x, y)$ represents the untransformed sub-image, $S(G(I_A), x, y)$ represents the transformed sub-image, $D_S(I_A, G(I_A))$ represents the first focus discrimination value, and $D_S(S(I_A, x, y), S(G(I_A), x, y))$ represents the second focus discrimination value. The value of the second generator loss function of the embodiment may be a value ranging from 0 and 1, and a lower value of the second generator loss function indicates that the image transform network 1 is closer to the ideal state. However, the disclosure is not limited thereto. The definition corresponding to the value may be adjusted based on computational needs.

Then, Step S43 is performed, where the transform discriminator 12 computes a transform discrimination value according to one of the transform template images, and computes another transform discrimination value according to the transformed image. At Step S43, the transform discriminator 12 randomly chooses a transform template image denoted by $I_B$ from the second database 3 and performs computation on the transform template image $I_B$ that is chosen to obtain the transform discrimination value denoted by $D(I_B)$. Besides, since the parameters of the image generator 11 are updated in Step S32, Step S1 is performed again. In other words, the transformed image $G(I_A)$ corresponding to the untransformed image $I_A$ is updated, and then the another transform discrimination value denoted by $D(G(I_A))$ is computed according to the updated transform image $G(I_A)$.

Then Step S42 is performed, where the transform discriminator 12 computes a value of a transform discriminator loss function according to the transform discrimination values $D(I_B)$ and $D(G(I_A))$, and updates the parameters of the transform discriminator 12 according to the value of the transform discriminator loss function. The value of the transform discriminator loss function is computed based on the transform discriminator loss function, and the transform discriminator loss function is denoted as the equation:

$$L(D) = \mathbb{E}_{I_A \sim P_A}[\log(D(G(I_A)))] + \mathbb{E}_{I_B \sim P_B}[\log(1 - D(I_B))]$$

wherein $L(D)$ represents the transform discriminator loss function, $\mathbb{E}$ represents an expected value, $I_A$ represents the untransformed image, $p_A$ represents the probability distribution of the first database 2, $I_A \sim P_A$ is configured to represent the untransformed image $I_A$ randomly chosen from the first database 2, $G(I_A)$ represents the transformed image, $I_B$ represents the transform template image, $p_B$ represents the probability distribution of the second database 3, $I_B \sim p_B$ is configured to represent the transform template image $I_B$ randomly chosen from the second database 3, and $D(G(I_A))$ and $D(I_B)$ represent the transform discrimination values.

The value of the transform discriminator loss function of the embodiment may be a value ranging from 0 to 1, and a lower value of the transform discriminator loss function indicates that the image transform network 1 is closer to the ideal state. However, the disclosure is not limited thereto. The definition corresponding to the value may be adjusted based on computational needs. In Step S42 of the embodiment, the transform discriminator 12 substitutes the transform discrimination values obtained by computing according to the transformed image and the transform template image into the transform discriminator loss function, i.e., the above equation, so as to compute the value of the transform discriminator loss function and update the parameters of the transform discriminator 12 accordingly.

Step S21 is performed, where the transform discriminator 12 computes a transform discrimination value according to the transformed image. Since the parameters of the transform discriminator 12 are updated in Step S42, the transform discriminator 12 in Step S21 of the embodiment performs computation on the transformed image $G(I_A)$ and updates the corresponding transfer discrimination value D $(G(I_A))$ according to the computation result. The transform discriminator 12 of the embodiment serves to discriminate the similarity or difference between input images, and the transform discrimination value is information representing a similarity level or a difference level between the images. Specifically, the transform discrimination value may be a value ranging from 0 to 1, and a greater value indicates a higher similarity level. However, the disclosure is not limited thereto, and the corresponding definition of the value may be adjusted based on the computational needs.

Then, Step S22 is performed, where the image generator 11 computes a value of a first generator loss function according to the transform discrimination value and updates the parameters of the image generator 11 according to the value of the first generator loss function. In other words, the image generator 11 refers to the discrimination result of the transform discriminator 12 and computes the value of the first generator loss function based on the first generator loss function, and then adjusts and updates the parameters according to the value of the first generator loss function. The first generator loss function is denoted as the equation:

$$L(G)=\mathbb{E}_{I_A \sim P_A}[\log(1-D(G(I_A)))]$$

wherein L(G) represents the first generator loss function, $\mathbb{E}$ represents an expected value, $I_A$ represents the untransformed image, $p_A$ represents the probability distribution of the first database 2, $I_A \sim P_A$ represents the untransformed image $I_A$ randomly chosen from the first database 2, $G(I_A)$ represents the transformed image, and $D(G(I_A))$ represents the transform discrimination value. The value of the first generator loss function of the embodiment may be a value ranging from 0 and 1, and a lower value of the first generator loss function indicates that the image transform network 1 is closer to the ideal state. However, the disclosure is not limited thereto. The definition corresponding to the value may be adjusted based on computational needs.

Step S72 is performed to determine whether the value of the first generator loss function, the value of the second generator loss function, the value of the transform discriminator loss function, and the value of the focus discriminator loss function are all less than or equal to a threshold set in default. In addition, in the case where any of the value of the first generator loss function, the value of the second generator loss function, the value of the transform discriminator loss function, and the value of the focus discriminator loss function is greater than the threshold set in default, Steps S1, S51, S52, S33, S32, S43, S42, S21, S22, and S72 are repetitively carried out for learning and updating of the image generator 11, the transform discriminator 12, and the focus discriminator 13.

In the case where the value of the first generator loss function, the value of the second generator loss function, the value of the transform discriminator loss function and the value of the focus discriminator loss function are all less than or equal to the threshold set in default, the image generator 11 is determined as having completed learning. In addition, Step 8 is performed, where the image generator 11 receives a test image and at least one corresponding focus information and the image generator 11 transforms the test image according to the updated parameters and the at least one test focus information, so as to generate a transformed test image. It should be noted that, in Step S8 of the embodiment, the image generator 11 transforms the test image by using the parameters most recently updated the image generator 11. In other words, the image transform method of the embodiment learns and optimizes the image transform network 1 through minimizing the values of the first and second loss generator functions, the value of the transform discriminator loss function, and the value of the focus discriminator loss function. In the embodiment, each test image has one test focus information. However, the test image may have multiple test focus information, and shall not be limited by the embodiment.

In other embodiments, in Step S72, the criterion for determining whether the image generator 11, the transform discriminator 12, and the focus discriminator 13 have completed learning and updating may also be whether the value of the first generator loss function, the value of the second generator loss function, the value of the transform loss function, and the value of the focus discriminator loss function respectively converge. In other words, the image generator 11 may be determined as having completed learning in the case where the values of the first and second generator loss functions, the value of the transform discriminator loss function, and the value of the focus discriminator loss function all converge. Therefore, the determination criterion of the disclosure shall not be limited to the threshold of the embodiment.

It should be noted that the order between Steps S51 and S52 and Steps S33 and S32 is interchangeable. In other words, in other embodiments, Steps S33 and S32 may also be performed in sequence after Step S1 is performed. Then, after Step 32 is performed, Steps S51 and S52 are performed in sequence. Therefore, the order for performing the steps is not limited to the order described in the embodiment.

It should also be noted that the image generator 11 may be integrated in a mobile device, and the test image and the corresponding test focus information may be obtained from the lens of the mobile device. The test focus information of the test image may be determined when the user captures an image, such as the information at the time when the user touches the screen of the mobile device to focus when capturing the image. In the embodiment, the image generator 11 transforms the image obtained by the mobile device to generate the transformed test image exhibiting a shallow depth-of-field effect. However, the exhibited effect is not limited to the shallow depth-of-field effect, but may also be other image transform effects, such as image brightness transformation, color optimization, etc.

In the image transform method of the embodiment, the image generator 11 computes the value of the first generator loss function to update the parameters by using the transform discrimination value of the transform discriminator 12, and computes the value of the transform loss function to update the transform discriminator 12. Besides, the focus discriminator 13 is updated according to the value of the focus loss function. In addition, the focus discriminator 13 computes the focus discrimination value by using the focus information, and computes the value of the second generator loss function, so as to update the parameters of the image generator 11. In other words, the image generator 11 of the embodiment is engaged in adversarial learning with the transform discriminator 12 and the focus discriminator 13, and the parameters of the image generator 11 are accomplished through at least two stages of learning computation.

Referring to FIGS. 7, 8, and 9, FIGS. 7, 8, and 9 are flowcharts illustrating an image transform method according to another embodiment of the disclosure. Similar to the embodiment shown in FIGS. 5, 6, and 9, the image transform method of the embodiment is for the image transform network 1 connected with the first database 2 and the second database 3 shown in FIG. 3. The image transform method of the embodiment differs from the embodiment of FIGS. 5, 6, and 9 in that each untransformed image has a plurality of focus information. Here, an embodiment with two focus information is described as an example. The focus information of the untransformed image of the embodiment includes a first focus information $(x_1, y_1)$ and a second focus information $(x_2, y_2)$.

The difference in steps performed between the embodiment and the embodiment shown in FIGS. 5, 6, and 9 is described in the following. FIG. 7 is a flowchart illustrating details of Step 33 of the embodiment. Referring to FIG. 7, Step S33 of the embodiment includes the following. Step S331 is performed, where the focus discriminator 13 computes according to the one of the untransformed images (i.e., the untransformed image $I_A$) and the transformed image to generate the first focus discrimination value. Step S335 is performed, where the focus discriminator 13 computes according to the one of the untransformed images (i.e., the untransformed image $I_A$), the first focus information, and the second focus information to generate a plurality of second focus discrimination values.

FIG. 8 is a flowchart illustrating details of Step 335 of the embodiment. Referring to FIG. 8, Step S335 of the embodiment includes the following. Step S336 is performed, where the focus discriminator 13 generates a first untransformed sub-image according to the first focus information $(x_1, y_1)$ and the one of the untransformed images, i.e., the untransformed image $I_A$, generates a second untransformed sub-image according to the second focus information $(x_2, y_2)$ and the untransformed image, generates a first transformed sub-image according to the first focus information $(x_1, y_1)$ and the transformed image, and generates a second transformed sub-image according to the second focus information $(x_2, y_2)$ and the transformed image. In the embodiment, the focus discriminator 13 obtains blocks respectively corresponding to the first focus information $(x_1, y_1)$ and the second focus information $(x_2, y_2)$ in the untransformed image $I_A$ to serve as the first untransformed sub-image and the second untransformed sub-image respectively denoted by $S(I_A, x_1, y_1)$ and $S(I_A, x_2, y_2)$, and obtains blocks respectively corresponding to the first focus information $(x_1, y_1)$ and the second focus information $(x_2, y_2)$ in the transformed image $G(I_A)$ to serve as the first transformed sub-image and the second transformed sub-image respectively denoted by $S(G(I_A), x_1, y_1)$ and $S(G(I_A), x_2, y_2)$.

Then, Step S337 is performed, where the focus discriminator 13 computes according to the first untransformed sub-image $S(I_A, x_1, y_1)$, the second untransformed sub-image $S(I_A, x_2, y_2)$, the first transformed sub-image $S(G(I_A), x_1, y_1)$, and the second transformed sub-image $S(G(I_A), x_2, y_2)$ to generate two second focus discrimination values respectively denoted by $D_S(S(I_A, x_1, y_1), S(G(I_A), x_1, y_1))$ and $D_S(S(I_A, x_2, y_2), S(G(I_A), x_2, y_2))$.

After the first and second focus discrimination values are obtained, Step S32 is performed, where the image generator 11 computes the value of the second generator loss function according to the first and second focus discrimination values and updates the parameters of the image generator 11 according to the value of the second generator loss function. In the embodiment, the second generator loss function denoted as the equation:

$$L(G_S)= \mathbb{E}_{I_A \sim p_A}[\log(1-D_S(I_A, G(I_A)))]+ \mathbb{E}_{I_A \sim p_A}[\log(1-D_S(S(I_A,x_1,y_1),S(G(I_A),x_1,y_1)))]+ \mathbb{E}_{I_A \sim p_A}[\log(1-D_S(S(I_A,x_2,y_2),S(G(I_A),x_2,y_2)))]$$

wherein $L(G_S)$ represents the second generator loss function, $\mathbb{E}$ represents an expected value, $I_A$ represents the untransformed image, $G(I_A)$ represents the transformed image, $p_A$ represents the probability distribution of the first database 2, $I_A \sim p_A$ serves to represent that the untransformed image $I_A$ is randomly chosen from the first database 2, $(x_1, y_1)$ and $(x_2, y_2)$ represent the focus information, $S(I_A, x_1, y_1)$ and $S(I_A, x_2, y_2)$ represent the untransformed sub-images, $S(G(I_A), x_1, y_1)$ and $S(G(I_A), x_2, y_2)$ represent the transformed sub-images, $D_S(I_A, G(I_A))$ represents the first focus discrimination value, and $D_S(S(I_A, x_1, y_1), S(G(I_A), x_1, y_1))$ and $D_S(S(I_A, x_2, y_2), S(G(I_A), x_2, y_2))$ represent the second focus discrimination values. The value of the second generator loss function of the embodiment may be a value ranging from 0 and 1, and a lower value of the second generator loss function indicates that the image transform network 1 is closer to the ideal state. However, the disclosure is not limited thereto. The definition corresponding to the value may be adjusted based on computational needs.

It should be noted that, similar to the previous embodiment, at Step S8, the image generator 11 receives a test image and at least one test focus information corresponding to the test image, and the image generator 11 transforms the test image according to the updated parameters and the at least one test focus information, so as to generate a transformed test image. However, in the embodiment, each test image has two test focus information, but the disclosure is not limited thereto. The number of the test focus information may also be greater than 2. It should be noted that, in Step S8 of the embodiment, the image generator 11 transforms the test image by using the parameters most recently updated the image generator 11.

It should be noted that the image transform network of the disclosure may include a plurality of software or firmware programs similar to the generative adversarial network (GAN), and may also be a circuit module. Besides, the image transform method of the disclosure may be implemented in the form of computer program, and the computer program executes the image transform method through a processor and a memory. Moreover, except for the case where the order of execution is specifically described, the steps of the image transform method of the disclosure may be adjusted according to practical needs. In addition, some or all of the steps may be executed simultaneously.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image transform method for an image transform network connected with a first database and comprising an image generator, a transform discriminator, and a focus discriminator, the first database storing a plurality of untransformed images, and the image transform method comprising:
    computing by the image generator according to one of the untransformed images and at least one focus information of the one of the untransformed images to generate a transformed image;
    computing a transform discrimination value according to the transformed image by the transform discriminator;
    computing a value of a first generator loss function according to the transform discrimination value and updating parameters of the image generator according to the value of the first generator loss function by the image generator;

computing by the focus discriminator according to the one of the untransformed images, the transformed image, and the at least one focus information to generate at least one focus discrimination value; and computing a value of a second generator loss function according to the at least one focus discrimination value and updating the parameters of the image generator according to the value of the second generator loss function by the image generator.

2. The image transform method as claimed in claim 1, wherein the image transform network is further signal-connected with a second database storing a plurality of transform template images, and the image transform method further comprises:

computing another transform discrimination value by the transform discriminator according to one of the transform template images; and computing a value of a transform discriminator loss function according to the transform discrimination values and updating parameters of the transform discriminator according to the value of the transform discriminator loss function by the transform discriminator.

3. The image transform method as claimed in claim 1, further comprising:

computing a value of a focus discriminator loss function by the focus discriminator according to two of the untransformed images; and updating parameters of the focus discriminator by the focus discriminator according to the value of the focus discriminator loss function.

4. The image transform method as claimed in claim 1, further comprising:

receiving a test image and at least one test focus information by the image generator; and transforming the test image by the image generator according to the updated parameters of the image generator and the at least one test focus information to generate a transformed test image.

5. The image transform method as claimed in claim 1, wherein computing by the focus discriminator according to the one of the untransformed images, the transformed image, and the at least one focus information to generate the at least one focus discrimination value comprises:

computing by the focus discriminator according to the one of the untransformed images and the transformed image to generate a first focus discrimination value; and computing by the focus discriminator according to the one of the untransformed images and the at least one focus information to generate at least one second focus discrimination value, wherein the image generator computes the value of the second generator loss function according to the first focus discrimination value and the at least one second focus discrimination value.

6. The image transform method as claimed in claim 5, wherein computing by the focus discriminator according to the one of the untransformed images and the at least one focus information to generate the at least one second focus discrimination value comprises:

generating at least one untransformed sub-image by the focus discriminator according to the at least one focus information and the one of the untransformed images;

generating at least one transformed sub-image by the focus discriminator according to the at least one focus information and the transformed image; and computing by the focus discriminator according to the at least one untransformed sub-image and the at least one transformed sub-image to generate the at least one second focus discrimination value.

7. The image transform method as claimed in claim 1, wherein the transform discrimination value and the at least one focus discrimination value are difference level information or similarity level information between images.

8. The image transform method as claimed in claim 1, further comprising determining whether the value of the first generator loss function and the value of the second generator loss function are both less than or equal to a threshold set in default, and when any of the value of the first generator loss function and the value of the second generator loss function is greater than the threshold set in default, performing steps:

computing by the image generator according to one of the untransformed images and at least one focus information of the one of the untransformed images to generate a transformed image;

computing a transform discrimination value according to the transformed image by the transform discriminator;

computing a value of a first generator loss function according to the transform discrimination value and updating the parameters of the image generator according to the value of the first generator loss function by the image generator;

computing by the focus discriminator according to the one of the untransformed images, the transformed image, and the at least one focus information to generate at least one focus discrimination value; and computing a value of a second generator loss function according to the at least one focus discrimination value and updating the parameters of the image generator according to the value of the second generator loss function by the image generator.

9. The image transform method as claimed in claim 2, further comprising:

computing a value of a focus discriminator loss function by the focus discriminator according to two of the untransformed images; and updating parameters of the focus discriminator by the focus discriminator according to the value of the focus discriminator loss function.

10. The image transform method as claimed in claim 9, further comprising determining whether the value of the first generator loss function, the value of the second generator loss function, the value of the transform discriminator loss function and the value of the focus discriminator loss function are all less than or equal to a threshold set in default, and when any of the value of the first generator loss function, the value of the second generator loss function, the value of the transform discriminator loss function and the value of the focus discriminator loss function is greater than the threshold set in default, performing steps:

computing a value of a focus discriminator loss function by the focus discriminator according to two of the untransformed images; and updating the parameters of the focus discriminator by the focus discriminator according to the value of the focus discriminator loss function.

11. An image transform network, signal-connected with a first database storing a plurality of untransformed images, the image transform network comprising:

an image generator, configured to perform computing and generate a transformed image according to one of the untransformed images and at least one focus information of the one of the untransformed images;

a transform discriminator, signal-connected with the image generator, and configured to perform computing and generate a transform discrimination value according to the transformed image; and a focus discriminator, signal-connected with the image generator, and configured to perform computing according to the one of the untransformed images, the transformed image, and the at least one focus information to generate at least one focus discrimination value, wherein the image generator is further configured to perform:

computing a value of a first generator loss function according to the transform discrimination value and updating parameters of the image generator according to the value of the first generator loss function; and computing a value of a second generator loss function according to the at least one focus discrimination value and updating the parameters of the image generator according to the value of the second generator loss function.

12. The image transform network as claimed in claim 11, further signal-connected with a second database storing a plurality of transform template images, wherein the transform discriminator of the image transform network is further configured to perform:

computing another transform discrimination value according to one of the transform template images; and computing a value of a transform discriminator loss function according to the transform discrimination values and updating parameters of the transform discriminator according to the value of the transform discriminator loss function.

13. The image transform network as claimed in claim 11, wherein the focus discriminator is further configured to perform:

computing a value of a focus discriminator loss function according to two of the untransformed images; and updating parameters of the focus discriminator according to the value of the focus discriminator loss function.

14. The image transform network as claimed in claim 11, wherein the focus discriminator is further configured to perform:

computing according to the one of the untransformed images and the transformed image to generate a first focus discrimination value; and computing according to the one of the untransformed images and the at least one focus information to generate at least one second focus discrimination value, wherein the image generator computes the value of the second generator loss function according to the first focus discrimination value and the at least one second focus discrimination value.

15. The image transform network as claimed in claim 14, wherein the focus discriminator is further configured to perform:

generating at least one untransformed sub-image according to the at least one focus information and the one of the untransformed images;

generating at least one transformed sub-image according to the at least one focus information and the transformed image; and computing according to the at least one untransformed sub-image and the at least one transformed sub-image to generate the at least one second focus discrimination value.

16. The image transform network as claimed in claim 11, wherein the transform discrimination value and the at least one focus discrimination value are difference level information or similarity level information between images.

17. The image transform network as claimed in claim 11, wherein the image generator is further configured to perform:

receiving a test image and at least one test focus information; and transforming the test image according to the parameters of the image generator updated by the image generator and the at least one test focus information to generate a transformed test image.

* * * * *